US008764534B1

(12) United States Patent
DeSanti et al.

(10) Patent No.: US 8,764,534 B1
(45) Date of Patent: Jul. 1, 2014

(54) SYSTEM AND METHOD FOR MAINTAINING USER ENGAGEMENT IN A REALM-BUILDING GAME

(71) Applicants: Brian DeSanti, San Bruno, CA (US); Travis Hawk, San Bruno, CA (US); Tim Ernst, Millbrae, CA (US)

(72) Inventors: Brian DeSanti, San Bruno, CA (US); Travis Hawk, San Bruno, CA (US); Tim Ernst, Millbrae, CA (US)

(73) Assignee: Kabam, Inc., San Francisco, CA (US)

( * ) Notice: Subject to any disclaimer, the term of this patent is extended or adjusted under 35 U.S.C. 154(b) by 13 days.

(21) Appl. No.: 13/661,568

(22) Filed: Oct. 26, 2012

(51) Int. Cl.
*A63F 9/24* (2006.01)
*A63F 13/00* (2014.01)

(52) U.S. Cl.
USPC .................................. 463/9; 463/31

(58) Field of Classification Search
USPC ...................... 463/9, 29–31, 40–42
See application file for complete search history.

(56) References Cited

U.S. PATENT DOCUMENTS

| | | | |
|---|---|---|---|
| 8,016,680 B1* | 9/2011 | Hutter et al. .................... | 463/42 |
| 8,109,818 B2 | 2/2012 | Pottinger et al. ................. | 463/9 |
| 2003/0008696 A1* | 1/2003 | Abecassis et al. ............... | 463/9 |
| 2003/0126035 A1* | 7/2003 | Kake et al. ....................... | 705/26 |
| 2004/0143852 A1* | 7/2004 | Meyers .......................... | 725/133 |
| 2004/0193489 A1* | 9/2004 | Boyd et al. ...................... | 705/14 |
| 2007/0191101 A1 | 8/2007 | Coliz et al. ...................... | 463/42 |
| 2007/0207844 A1* | 9/2007 | Pottinger et al. .................. | 463/9 |
| 2008/0274805 A1* | 11/2008 | Ganz et al. ...................... | 463/29 |
| 2008/0293478 A1* | 11/2008 | Anderson et al. ................ | 463/25 |
| 2010/0331084 A1 | 12/2010 | Fuzell-Casey et al. .......... | 463/31 |
| 2012/0246701 A1* | 9/2012 | Swamy et al. .................... | 726/4 |
| 2012/0329556 A1* | 12/2012 | Eddy et al. ....................... | 463/30 |

OTHER PUBLICATIONS

Roller Coaster Tycoon, Chris Sawyer, (c) 2001 Infogrames Interactive.*
Narcisse, Evan, "Fenix Rising DLC Adding Prestige Style Rewards to Gear of War 3 in January", Gears of War, Dec. 21, 2011 11:00 AM; http://kotaku.com/5870050/fenix-rising-dlc-adding-prestige-style-rewards-to-gear-of-war . . . printed Oct. 26, 2012, 4 pages.
Prestige Mode, http://callofduty.wikia.com/wiki/Prestige_Mode, printed Oct. 26, 2012,10 pages.

* cited by examiner

*Primary Examiner* — Milap Shah
(74) *Attorney, Agent, or Firm* — Pillsbury Winthrop Shaw Pittman LLP

(57) ABSTRACT

Disclosed herein is technology for extending a user's play of a realm-building game. A user playing the realm-building game may have an existing realm built from one or more basic assets. A value may be assigned to the existing realm based on basic assets used to build it. Then a difference may be determined between the value of the realm and a threshold value. If above the threshold value, the user may be offered the option to improve the realm for a cost. The cost may be based on the difference between the value assigned to the realm and the threshold value. If the user decides to improve the realm, the realm may be removed, including all assets used to build it and the user may be provided with one or more advanced assets to build a second realm.

17 Claims, 2 Drawing Sheets

SYSTEM AND METHOD FOR MAINTAINING USER ENGAGEMENT IN A REALM-BUILDING GAME

FIELD

The disclosure relates to a realm-building game that includes features for extending a user's play of the realm-building game.

BACKGROUND

Some video games are known as realm-building games. A realm building game involves a user building a realm—it may be a village, a city, a kingdom, or similar "realm"—using assets, e.g., buildings, that each perform a particular function that further the building of the realm, e.g., they may produce resources necessary to use additional assets or they meet prerequisites for other assets. Realm building games may be single player or multiplayer, and in some cases, users log into a realm-building game from a social networking platform, e.g., Facebook, Google-F, and the like. Realm-building games may have an endpoint though where the user's enjoyment stagnates because the user has built the biggest realm possible or has used all of the assets available to him or her in building his or her realm.

SUMMARY

One aspect of the disclosure relates to a system and/or method for a realm-building game. The realm-building game provides a mechanic that may extend the playability, or replayability of game content for advanced users. In some implementations the system may include one or more processors configured to execute computer program modules. The computer program modules may include a realm management module, an asset management module, a user account module, a realm valuation module, a realm improvement module, a bonus module, a faction association module, and/or other modules.

In some versions, the realm management module may be configured to provide realm building tools to the user. The realm building tools may include a set of one or more assets. In some implementations, the asset management module may be configured to provide the set of one or more assets to the realm management tool. Typically, the set of assets initially includes one or more basic assets. There may also be a user account module, which may be configured to manage a user account associated with the user. The user account may include information about a realm built from basic assets.

There may also be a realm valuation module. The realm valuation module may be configured to assign a value to the realm based on which basic assets are used to build the realm. In some cases, there may also be a realm improvement module which may be configured to offer an option to the user to improve the existing realm for a cost. In some implementations, the cost to improve the realm is based on the difference between the value assigned to the realm and a threshold value. The realm improvement module may also be further configured to remove the existing realm and to direct the asset management module to provide advanced assets to the realm management module for use in the realm building tools.

In one aspect, there may also be a method, executed on a computer processor, for extending a user's play of a realm-building game. Initially, the realm-building game may have an existing realm built from one or more basic assets. A value may be assigned to the existing realm based on the basic assets used to build it. Then a difference may be determined between the value of the realm and a threshold value. Then, the user may be offered the option to improve the existing realm for a cost, which may be based on the difference between the value assigned to the realm and the threshold value. If the user decides to improve the realm, the realm may be removed, including all assets used to build it, and the user is provided with one or more advanced assets with which to build a second realm.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
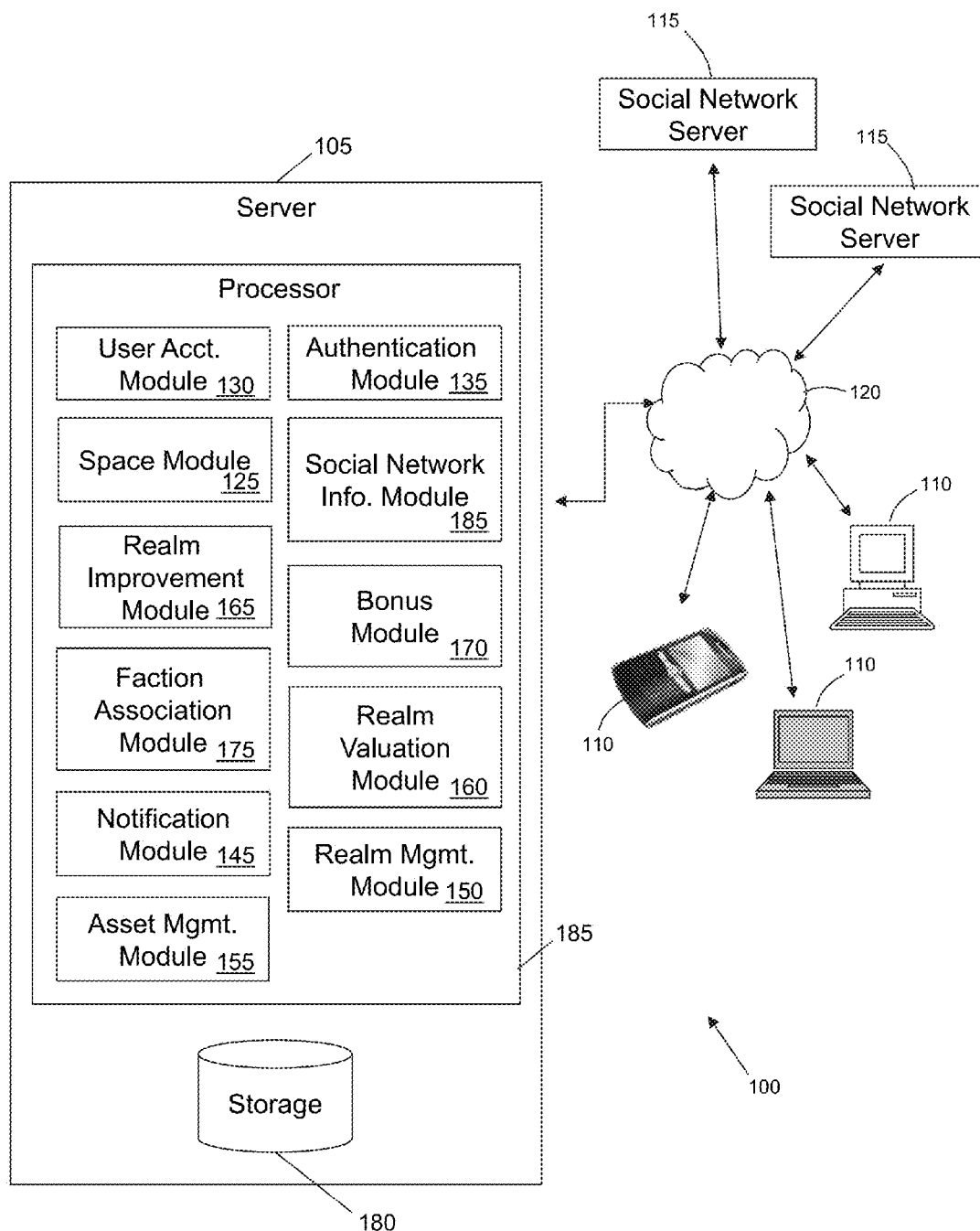
FIG. 1 illustrates a system configured to extend a user's play of a realm-building game.

FIG. 1 illustrates a system 100 configured to extend a user's play of a realm-building game. System 100 may enable users to play the realm-building game. In some implementations the realm-building game is an online realm-building game, and in some versions, system 100 may enable an individual user to log into the realm-building game from any of a plurality of different social networking platforms. In some implementations, system 100 may include a server 105. Server 105 may be configured to communicate via one or more electronic communication links with one or more client computing platforms 110 and/or social networking servers 115 according to a client/server architecture communicated over a network 120, e.g., the Internet, wide area network (WAN), local area network (LAN), or the like. The users may access system 100 and/or the realm-building game via client computing platforms 110.

Server 105 may be configured to execute one or more computer program modules. The one or more computer program modules may include one or more of a space module 125, a user account module 130, an authentication module 135, a social network information module 140, a notification module 145, and/or other modules.

Space module 125 may be configured to host a virtual space for access by users via client computing platforms 110. The users may participate in the realm-building game within the virtual space. Hosting the virtual space may include executing an instance of the virtual space, and implementing the instance of the virtual space to determine view information representing views of the virtual space. The view information may then be communicated from server 105 to client computing platforms 110 to facilitate presentation of the views to the users. The views may be presented to the users within user interfaces of applications being executed on client computing platforms 110 (e.g., web browsers). In some implementations, individual client computing platforms 110 may execute instances of the virtual space. In such implementations, client computing platforms 110 may generate views from a locally executed instance, or may receive view information from another client computing platform 110 in a peer-to-peer configuration. Space module 125 may execute an instance of the virtual space used to update, authenticate, confirm results from, and/or work in other ways with the instances of the virtual space executed locally on client computing platforms 110 to provide a virtual space in which users can interact with each other.

In some implementations, the virtual space (and/or the realm-building game) may be accessed through one of a plurality of different social networking platforms provided by one of social network servers 115. The term "social networking platform" is used generally, and the invention is not limited to traditional social networking platforms. Any platform that can provide games or virtual spaces and allows users to interact, e.g., Kabam.com, Steam, Kongregate, and the like, are within the scope of the invention with respect to "social networking platforms." In such implementations, accessing the virtual space through a given social networking platform may include logging into the virtual space through the given social networking platform, receiving a view of the virtual space within a user interface associated with the given social networking platform (e.g., within a web page hosted by the given social networking platform), and/or other mechanisms for accessing the virtual space from the given social networking platform.

The users may participate in the virtual space (and/or the realm-building game that takes place therein) by inputting input commands to their respective client computing platforms 110 that request an action to be taken within the instance of the virtual space (e.g., manipulate an object, build a building, control a character, and/or other actions). The input commands may then be implemented in the virtual space through the initiation of the requested actions (e.g., by space module 125 on server 105, in one or more instances of the virtual space on client computing platform(s) 110, etc.).

A virtual space may comprise a simulated space that is accessible by users via clients (e.g., client computing platforms 110) that present the views of the virtual space to a user. The simulated space may have a simulated physical layout, express ongoing real-time interaction by one or more users, and/or be constrained by simulated physics that governs interactions between virtual objects in the simulated space. In some instances, the simulated physical layout may be a 2-dimensional layout. In other instances, the simulated physical layout may be a 3-dimensional layout or a 3-dimensional-like but not fully 3-dimensional (i.e., "2.5D") layout. An instance of a virtual space may be persistent. That is, the instance of the virtual space may continue to exist whether or not any given user (or set of users) is currently logged in and/or receiving view information.

The above description of virtual spaces is not intended to be limiting. Space module 125 may be configured to express the virtual space in a more limited or more rich manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the space, beyond the relatively generic graphics. For example, a view of the virtual space may depict a given location in a relatively static manner that may or may not include representations of the characters, buildings, or a realm present at the location. In some implementations of the realm-building game, buildings or an entire realm may perform actions in a manner similar to the way characters perform actions in other games, e.g., attack other players, other player's characters, other player's buildings, or perform similar defensive actions. Additionally or alternatively, buildings or a realm may generate resources or units of characters that can perform actions on behalf of the user. Text may be used to express the actions of the characters, buildings, or realm present at the location (and/or effects of the actions or properties), and/or actions of the characters, buildings or realm (and/or effects) may be represented with a relatively limited set of still images and/or short animations. For example, a battle, a meeting, a game, and/or other activities at the given location may be depicted in this manner. Other expressions of individual places within the virtual space are contemplated.

Within the instance of the virtual space (or other virtual environment) executed by space module 125, users may control characters, buildings, or a realm to interact with the virtual space and/or each other. As used herein, the term "character", "building", or "realm" may refer to an object (or group of objects) present in the virtual space that represents an individual user. The characters, buildings, or realms may be controlled by the user with which it is associated. The characters, buildings, or realm may interact with the virtual space (e.g., non-player characters in the virtual space, other objects in the virtual space), or the characters, buildings, or realms may be relatively static visually within views of virtual space. The characters, buildings, or realms representing a given user may be created and/or customized by the given user. The characters, buildings, or realms may have an "inventory" of virtual goods and/or currency that the user can use (e.g., by manipulation of a character, a building, or a realm or other user controlled element, and/or other items), display, gift, and/or otherwise interact with within the virtual space.

User account module 130 may be configured to manage user accounts associated with individual users. The user accounts may include information stored by server 105, one or more of the client computing platforms 110, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

In some implementations, the user account module 130 includes information about one or more realms associated with the user account. The term "realm" may apply to a portion of a game map, one or more cities, towns or villages, or natural resources, e.g., wildernesses, forests, bodies of water, mineral deposits, or combinations of these. The information included in the user accounts may include character, building, or realm information. For a given user, the user account may include character, building, or realm information for one or more characters, buildings, or realms that are associated with the user in the virtual space. The one or more characters, buildings, or realms may be persistent within the virtual space. The one or more characters, buildings, or realms may be controllable by the given user in the virtual space. Controlling the one or more characters, buildings, or realms may enable the given user to advance within the realm-building game (e.g., as the user progress through the game content available in the virtual space). The given user may be able to control a plurality of the characters, buildings, or realms within the virtual space simultaneously. The given user may only be able to play one of the characters, buildings, or realms in the realm-building game in the virtual space at a time. Individual ones of the one or more characters, buildings, or realms may be unique within the virtual space (e.g., have a unique appearance, a unique name, a unique score or inventory, and/or be unique in other ways). The character(s), buildings, or realms for which information is saved in the user profile of the given user may be exclusive to the given user. That is, the given user may be the only user that controls those character(s), buildings, or realms. The information included in the user account for a given character, building, or realm may include one or more of a progress level, a status, a score, an inventory, and/or other information.

The information included in the user accounts may include social network authentication information. Social authentication information for a given user may include authentication information used to log into a social networking platform (e.g., username, password, and/or other authentication information), an identifier or other authentication information assigned to the given user by a social networking platform (e.g., without disclosing the authentication information to the given user), an authentication token or key, and/or other authentication information. User account module 130 may be configured such that an individual user may have a user account that includes social network authentication information from a plurality of different social networking platforms. This may enable the user to log into the virtual space (and/or the realm-building game) from any one of the plurality of different social networking platforms. This may enhance accessibility to the virtual space (and/or the realm-building game) for the user, in contrast to conventional systems in which a user logging into a realm-building game can only do so from an individual social networking platform.

Authentication module 135 may be configured to authenticate users to the virtual space (and/or the realm-building game therein). Authenticating users to the virtual space may include receiving authentication requests, determining whether individual ones of the authentication requests are valid, and logging users into the virtual space (and/or the realm-building game) that have submitted valid authentication requests. A valid authentication request may be an authentication request that includes authentication that is valid for one of the users. Determining whether a given authentication request is valid may include referencing one or more user accounts to determine if authentication information in the given authentication request matches authentication information stored in a user account.

In implementations in which users access the virtual space (and/or the realm-building game therein) through the social networking platforms provided by social network servers 115, authentication module 135 may be configured to receive authentication requests that are submitted by users through social network servers 115. These authentication requests may include social network authentication information. By way of example, a social networking platform may include a user interface element that is selectable by a user to initiate access to the virtual space (and/or the realm-building game). Responsive to selection of the user interface element on the social networking platform, an authentication request may be transmitted to server 105. Authentication module 135 may be configured to receive the authentication request and to determine whether it is a valid authentication request (e.g., corresponds to a current user of system 100). Responsive to the received authentication request being valid, access to the virtual space (and/or the realm-building game) may be provided to the user. This may include providing views of the virtual space to the user as described herein, and/or facilitating user participation in the realm-building game by controlling one or more characters associated with the user (e.g., one or more characters for which character information is saved in the user account of the user).

Authentication module 135 may be configured such that for an individual user, access may be provided responsive requests from a plurality of different social networking platforms. For example, when provided authentication information for the plurality of different social networking platforms are included in the user account for the individual user, authentication module 135 may be configured to receive an authentication request from any of the plurality of different social networking platforms and log the individual user into the virtual space through the same user account. For example, progress made in the game during a session initiated through a first social networking platform may still be reflected in the user account during a subsequent session initiated through a second social networking platform.

Social network information module 140 may be configured to receive social networking information from social network servers 115. The social network information may include information about the users gleaned by the social networking platforms through their usage. The social network information may include, for example social graph information (indicating friends or links between users in the social networking platforms), usage information (e.g., usage frequency, cumulative use, session length, material viewed, posted, or otherwise interacted with), demographic information, education information, and/or other information.

Social network information module 140 may be configured to aggregate social network information for individual users. This aggregation may include, for a given user, aggregating social network information that has the same or similar type across multiple social networking platforms. As a non-limiting example, social graph information may be combined across multiple social networking platforms to provide a more complete view of the social graph of the given user. This aggregated information may be implemented in providing the virtual space and/or the realm-building game to the user. For example, the aggregated information may be implemented to suggest alliances or other relationships within the virtual space, form groups of characters to participate in the realm-building game together, assess user value or potential user value, and/or customize other aspects of the virtual space (and/or the realm-building game). By using aggregated information from a plurality of different social networking platforms for an individual user, system 100 may provide enhanced customization over systems that only use information from a single social networking platform.

Notification module 145 may be configured to generate notifications to social networking platforms indicating activity by the users in the realm-building game session. This may include, responsive to a user performing an action in the realm-building game session that triggers a notification, generating notifications of the action to a plurality of social networking platforms on which the user has accounts. The notifications may cause an indication of the action to be displayed on walls (explained below) or similar spaces of the user in the social networking platforms. The notifications may provide indications to users of the social networking platforms that are linked with the user (e.g., through a friend relationship, through a link, and/or other relationships). The notifications may be selectable by the other users to gain access to the virtual space (and/or the realm-building game). Generating the notifications for the individual user to a plurality of social networking platforms may be enabled by the storage by user account module 130 of information related to user accounts of the individual user on the plurality of social networking platforms (e.g., social network authentication information and/or other information).

Social network servers 115 may be configured to host a plurality of social networking platforms. Social networking platforms may include online services or and/or sites that focus on building and reflecting social networks or social relations among people. These services and/or sites may enable users to form connections between each other that signify friendships, kinship, romantic relationships, professional relationships, and/or other relationships. These services and/or sites typically enable communication between users, and may provide individual users with "walls". A user's wall in a social networking platform may refer to a set of content that is available for viewing by other users (e.g., users that are linked to the user), and pertains to the user. The content on the user's wall may include content posted by the user, content posted by other users (e.g., users linked to the user), and/or other content. Content from the user's wall may be provided to other users (e.g., in their "feeds") in a broadcast manner.

In some implementations a realm management module 150 may be configured to provide realm building tools to a user. The realm building tools may include a set of one or more assets, for example, buildings. The realm building tools may also provide a set of one or more units, troops and/or characters. In some implementations the units, troops, and/or characters are the assets themselves. In other implementations they are different and the assets are configured to train or create the units, troops, and/or characters. The assets may include one or more basic assets or one or more advanced assets. The realm building tools may be provided by way of a user interface, e.g., a graphical user interface or a command line interface, which allows the user to choose assets, e.g., via mouse or keyboard selection, for use in building the realm. In some implementations the user may also additionally place the assets on a map or assign the assets to a location in the virtual space.

As described above, the assets may be basic assets or advanced assets. Initially, a player may be provided only with basic assets. In some implementations, basic assets may be buildings. Some non-limiting examples of basic assets are: a farm, a mine, a quarry, a sawmill, an alchemy lab, an apothecary, a barracks, a blacksmith, a castle, a cottage, an embassy, a fey spire, a guardian, a knights' hall, a market, a rally point, a relief station, a stable, a storehouse, a tavern, a wall, a watch tower, or a workshop. In some implementations there may also be a set of one or more basic units. The basic units may be troops or characters. Some non-limiting examples of basic unites are: a supply troop, a militiaman, a scout, a pikeman, a swordsman, an archer, a cavalry, a heavy cavalry, a supply wagon, a ballista, a battering ram, or a catapult.

Assets may have one or more properties associated with them. For example, a building may take up a particular amount of space on a map or in the virtual space. Assets may also perform functions such as resource generation, troop training, or defense. A resource generating asset such as a sawmill may have a property that is associated with the amount of resources it supplies for a given amount of time, e.g., 100 wood per hour. Where an asset is a troop or character, the properties may be how much attack power the asset has, or the range that the asset may attack from, with different assets having properties that may make them more useful in some situations and less useful in others. Additionally or alternatively, assets may have a level associated with them, and the level of the asset may affect the properties of the asset. For example, a level one sawmill may produce one hundred wood per hour whereas a level two sawmill may produce three hundred wood per hour. Additionally or alternatively, the level of an asset may determine which other assets may be used, e.g., a level one barracks may allow the player to train supply troop units and militiamen units where as a level two barracks may allow the player to also train scout units and pikemen units. In some versions, a higher level of an asset may reduce the time it takes to create other assets or train units, e.g., a level two barracks may allow the player to train troops faster than a level one barracks.

In some implementations, there are advanced assets, which may be better than basic assets in terms of the realm-building game's mechanics, e.g., resource production, attacking, defending, unit training, and the like. Some non-limiting examples of advanced assets may be assets such as a grove or a city center. In some implementations a grove allows the player to control all resource production from a single building or interface rather than the user manipulating multiple resource generating buildings, e.g., sawmills, quarries, mines, and farms. In some versions, the grove replaces the buildings of a realm built using the basic assets and the grove produces the same amount of resources for the player as a basic asset or multiple basic assets do. In some implementations, a city center consolidates several buildings into a single building and may also be at the maximum level at the outset. Consolidating the space or area within a virtual space used by basic assets in favor of the advanced assets may give the player additional spaces on the map or area within the virtual space to build on. Additionally or alternatively, the re-claiming of space may allow the player to further strategize how he or she will construct his or her city with the extra space provided.

In some implementations, an asset management module 155 may be configured to provide the set of one or more assets to the realm management module 150 for use by the realm-building tools. Providing the assets may be accomplished by the realm management module 150 requesting the assets from the asset management module 155. In some implementations, the assets are provided to the realm management module 150 by way of a response to an application program interface ("API") or software development kit ("SDK") call made by the realm management module 150. In other implementations the assets may be provided as a response to a database query by the realm management module 150. The asset management module 150 may also include and/or provide information about the assets such as pictures, images, animations, or properties of the asset, e.g., size on a map, time in the game to create or train the asset, resources required to create or train the asset, prerequisites required before creating or training the asset, and the like.

In some implementations, the set of assets provided to the realm management module 150 are a set of one or more basic assets. After the user has indicated a desire to improve the realm (see below), the asset management module 155 may provide to the realm management module 150 a set of one or more advanced assets which the user can use to build a new realm.

In some implementations, the asset management module 155 may have a user interface which allows a game designer, a game developer, a game producer, a platform provider, a system administrator or other personnel associated with providing the game (collectively "game managers") to change the properties of the assets. For example, the asset management module 155 may allow the game managers to upload new images or animations for an asset. Additionally or alternatively, the asset management module may provide a means of text input so that the game managers may enter values for the assets' properties via text input methods.

In some versions, there may be a realm valuation module 160. The realm valuation module 160 may be configured to assign a value to a realm based on the basic assets used to build it. For example, if a realm includes three level one mines, a level one sawmill, a level one cottage, a level two cottage, and a level two knights' hall, the realm valuation module may assign the realm a value of twenty five points for each of the mines, twenty five points for the sawmill, fifty points for the level one cottage, sixty points for the level two cottage (fifty points as a cottage plus ten more for being level two), and one hundred twenty points for the knights' hall (one hundred points for being a knights' hall and twenty for being a level two knights' hall). As described in the example, values assigned per asset may be based on the asset itself and also on the asset's level (in implementations with asset levels). Also as illustrated in the example, the points awarded per level may differ based on which asset is being considered, e.g., a cottage may get ten points per level whereas a knights' hall may get twenty points per level and in some cases the points per level for a given asset may also differ. The point assignments per asset and per level may be set by the game managers. The values may be part of the properties associated with each asset and may be assignable through the asset management module 155 and changed as needed by the game managers e.g., during maintenance periods or system patches, as part of an expansion process, or even real-time while players are playing the game.

In some implementations there may be a realm improvement module 165 configured to offer an option to the user to improve the realm for a cost. In some implementations, "improving" the realm is called "ascension" or "ascending." In some versions, the cost to improve the realm is based on the difference between a threshold value and the value assigned to the realm by the realm valuation module 160. The threshold value may be set by the game managers when the game is developed, when the game is launched, may change over time after the game is live, or some combination of these. The cost to the user in some versions may be paid by virtual or actual currency, by virtual goods or resources, or by converting real currency into virtual currency and then using the virtual currency. Additionally or alternatively, the cost may also involve having the user perform actions within the game, e.g., completing a quest, or perform actions outside the game, e.g., posting a message about improving the user's realm to a social networking site via the notification module 145, which may lessen the cost that is based on the difference between the value and the threshold, or the determination of the cost may take the action(s) into account as part of the determination. In some implementations, the cost may be based on the difference between the value and the and the cost that the user "pays" is the number of in-game or social networking actions the user must perform, e.g., complete five quests or invite five users to the game. Additionally or alternatively, the cost to improve the realm may decrease over time as the user continues to build the realm. In other words, as more and more basic assets are used, the value of the realm may increase, and the valuation module may then assign a new, higher value to the realm. This may lower the difference between the threshold value and the realm's value which may correspond to a smaller cost due to the smaller difference between the realm's value and the threshold value. As some point, in these scenarios, the cost of improving the realm is reduced to zero as the value of the realm equals or exceeds the threshold value. In those implementations, the cost to improve the realm may be zero.

In some versions, the option to improve the realm may be presented in the form of a menu option in the user interface of the game, or alternatively the user may receive an in-game item that allows the user to improve the realm. In some implementations, there may be a prerequisite realm value before the user is even presented with the option to improve the realm. For example, upon the user logging in and every ten minutes while the user plays, the realm valuation module 160 may assign a value to the user's realm using the methods described above. Based on this value calculation, if the user's realm is above a presentation threshold value (different than the cost threshold), the user may be presented with the option to improve the realm for the calculated difference between the realm's value and the cost threshold. In other implementations, the determination is made similar to that just described, but the presentation threshold may be that 1) the user's realm is assigned a certain value and 2) the user is some amount of, e.g., virtual goods, virtual currency inventory, or real world currency, away from a desired amount, e.g., the game managers decide that the option to improve the realm should be presented when the user is five dollars' worth of virtual currency away from the cost of improving the realm being zero.

In some implementations the realm improvement module 165 may be configured to remove the existing realm from the map and/or the virtual space. This allows the player to build a new realm where the existing realm once was. In some implementations, the realm improvement module 165 directs the asset management module 155 to provide a set of one or more advanced assets to the realm management module 150 for use in the realm building tools. In some implementations, the realm improvement module 165 directs the asset management module 155 by way of requesting the performance an application program interface ("API") or software development kit ("SDK") function or procedure call.

In some versions, there is a bonus module 170 configured to provide one or more in-game bonuses to the user depending on if the user improves the realm. The bonus module 170 may store value modifiers that are applied to a realm or its assets and/or units during in-game events. For example, when a realm is in combat, its units, e.g., Militiamen, may have a base attack power of one hundred. The bonus module 170 may store a modifier of "attack +10%" which grants an additional ten percent (i.e., ten points) of attack power to the units. In some implementations, a bonus may reduce a value, e.g., "attack −10%" which reduces a unit's attack power by ten percent. This allows a game designer to create a bonus system with trade-offs that the player may face. This may increase the user's sense of enjoyment of the game due to the underlying additional strategic element. Non-limiting examples of bonuses that alter the realm or its assets and/or units included increases/decreases to attack range, speed, or power, increases/decreases to defense range, speed, or power, increases/decreases to unit movement speed, increases/decreases to building construction time, increases/decreases to experience or other metrics earned, e.g., competitive metrics such as "might", and/or increases/decreases to virtual currency and/or items found and/or won in battle. In some implementations the bonus module 170 may be instructed by a faction association module 175 to provide certain bonuses depending on which faction the user chose to align with.

As mentioned above, in some implementations, there is a faction association module 175. The faction association module may be configured to offer an association with a faction to the user and to receive the user's response to the offer. The offer may include the option to associate with one or more factions, e.g., the Fey (corrupted humans), the Britons, or the Druids. If the user aligns with a faction, the asset management module 155 may base which advanced assets to provide to the user based on which faction the user chose to align with. In these implementations, this provides a user with access to advanced assets (through the realm building tools) that were not available before the user aligned with the faction. Additionally or alternatively, aligning with a faction may provide the player with access to new resources, units, troops and/or characters specific to that faction.

In some versions, being aligned with the various factions may cause the bonus module 170 to confer benefits to the user or realm specific to that faction. For example, the Druid faction may embody a druid's oneness with nature, and players that align a realm with the Druid faction may gain access to healing powers that are improved over what was available to the user before he associated himself with that faction. In some versions, users may gain bonuses (or "blessings") with each improvement level. And, as an example, the user may use the blessings to unlock new assets, resources, units, troops and/or characters, special abilities for the new units, troops and/or characters, give bonuses to the new buildings, and provide other bonuses or benefits to gameplay that support the theme of the selected faction. For example, the user gaining a "Fighting Spirit" blessing may allow the user to create a "Bloodthorn" combat unit, whereas a "Mystical Arts" blessing may allow the user to create an "Enchantress" combat unit. Other blessings may reduce the upkeep cost of units, e.g., reduce the upkeep of the Bloodthorn or Enchantress units by twenty five percent or reduce resources or prerequisites required to build or train the units. Other blessings may improve the speed of units or trade off bonuses for penalties. For example, a "Lightened Feet" blessing may increases the march or movement speed of a group of units by twenty five percent if that group contains a Bloodthorn or Enchantress unit. Or, alternatively, there may be a blessing such as "Sweeping Strikes", which boosts a Bloodthorn unit's attacks damage so it affects two opposing units at once, but reduces the health of the Bloodthorn unit. Or in some versions, the blessing may serve a defensive purpose, e.g., Bloodthorn unit may improve an evasion rate by twenty five percent, but as a consequence the Bloodthornm unit deals less damage to opposing units. The foregoing examples of units and blessings are just examples and not intended to be complete or limiting. Indeed, the Britons faction may have its own set of blessings and/or units, as may the Fey. As with Druids, the Britons and Fey may have blessings and/or units that coincide with a particular story-telling aspect of the game, e.g., whereas the Druids may be nature-oriented, Britons may be weapon and combat-oriented, and Fey may be magic-oriented.

Different blessings may be considered major blessings which confer large improvements and some blessings may be considered minor blessings, which confer smaller improvements. In some implementations, blessings may cost virtual or actual currency, with the major blessings costing more than the minor blessings. In other implementations they may be free or a reward for completing an in-game activity, e.g., completing a quest.

A given client computing platform 110 may include one or more processors, and electronic display, a control interface, and/or other components. The one or more processors may be configured to execute computer program modules. The computer program modules may be configured to enable or user associated with the given client computing platform 110 to interface with system 100, and/or provide other functionality attributed herein to client computing platforms 110. For example, the computer program modules may include a view module configured to receive view information from server 105 (e.g., generated by space module 125), and to present a view of the virtual game environment (e.g., as described above) based on the received view information. This may facilitate participation by the user of the given client computing platform 110 in the game taking place in the virtual game environment. By way of non-limiting example, the given client computing platform 110 may include one or more of a desktop computer, a laptop computer, a handheld computer, a tablet computing platform, a NetBook, a Smartphone, a gaming console, and/or other computing platforms.

Server 105 may include electronic storage 180, one or more processors 185, and/or other components. Server 105 may include communication lines, or ports to enable the exchange of information with a network and/or other computing platforms. Illustration of server 105 in FIG. 1 is not intended to be limiting. Server 105 may include a plurality of hardware, software, and/or firmware components operating together to provide the functionality attributed herein to server 105. For example, server 105 may be implemented "in the cloud" by a plurality of computing platforms operating together as server 105.

Electronic storage 180 may comprise electronic storage media that electronically stores information. The electronic storage media of electronic storage 180 may include one or both of system storage that is provided integrally (i.e., substantially non-removable) with server 105 and/or removable storage that is removably connectable to server 105 via, for example, a port (e.g., a USB port, a firewire port, etc.) or a drive (e.g., a disk drive, etc.). Electronic storage 180 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 180 may include one or more virtual storage resources (e.g., cloud storage, a virtual private network, and/or other virtual storage resources). Electronic storage 180 may store software algorithms, information determined by processor 185, information received from server 105, information received from client computing platforms 110, and/or other information that enables server 105 to function as described herein.

Processor(s) 185 is configured to provide information processing capabilities in server 105. As such, processor 185 may include one or more of a digital processor, an analog processor, a digital circuit designed to process information, an analog circuit designed to process information, a state machine, and/or other mechanisms for electronically processing information. Although processor 185 is shown in FIG. 1 as a single entity, this is for illustrative purposes only. In some implementations, processor 185 may include a plurality of processing units. These processing units may be physically located within the same device, or processor 185 may represent processing functionality of a plurality of devices operating in coordination. The processor 185 may be configured to execute modules 140, 145, 130, 155, 160, 165, 170, and/or

175. Processor 185 may be configured to execute modules 140, 145, 130, 155, 160, 165, 170, and/or 175 by software; hardware; firmware; some combination of software, hardware, and/or firmware; and/or other mechanisms for configuring processing capabilities on processor 185.

It should be appreciated that although modules 140, 145, 130, 155, 160, 165, 170, and/or 175 are illustrated in FIG. 1 as being co-located within a single processing unit, in implementations in which processor 185 includes multiple processing units, one or more of modules 140, 145, 130, 155, 160, 165, 170, and/or 175 may be located remotely from the other modules. As a non-limiting example, some or all of the functionality attributed to modules 140, 145, 130, 155, 160, 165, 170, and/or 175 may be provided "in the cloud" by a plurality of processors connected through a network. The description of the functionality provided by the different modules 140, 145, 130, 155, 160, 165, 170, and/or 175 herein is for illustrative purposes, and is not intended to be limiting, as any of modules 140, 145, 130, 155, 160, 165, 170, and/or 175 may provide more or less functionality than is described. For example, one or more of modules 140, 145, 130, 155, 160, 165, 170, and/or 175 may be eliminated, and some or all of its functionality may be provided by other ones of modules 140, 145, 130, 155, 160, 165, 170, and/or 175. As another example, processor 185 may be configured to execute one or more additional modules that may perform some or all of the functionality attributed below to one of modules 140, 145, 130, 155, 160, 165, 170, and/or 175. Modules 140, 145, 130, 155, 160, 165, 170, and/or 175 may execute on one server, on multiple distinct servers, there may be a server for each respective module, or the modules may be combined in any number of permutations to execute on any number of servers. Furthermore, server 105 may be a hardware server or it may be a process with a designated memory space executed on a hardware processor.

It will be appreciated that illustration in FIG. 1 and the description herein of modules 140, 145, 130, 155, 160, 165, 170, and/or 175 being provided for implementation with a single realm-building game and/or virtual space (e.g., provided by space module 125) is not intended to be limiting. In some implementations, one or more of modules 140, 145, 130, 155, 160, 165, 170, and/or 175 may provide the functionality described herein for a plurality of separate realm-building games and/or virtual spaces (e.g., provided by a plurality of space modules). Such implementations may reduce redundancy of an entity that provides a plurality of different realm-building games and/or virtual spaces to users through the social networking platforms. In such implementations, the one or more of modules 140, 145, 130, 155, 160, 165, 170, and/or 175 that are provided to serve a plurality of different realm-building games (and/or virtual spaces) may be executed in a separate server from the server(s) executing the space modules.

Figure 2:
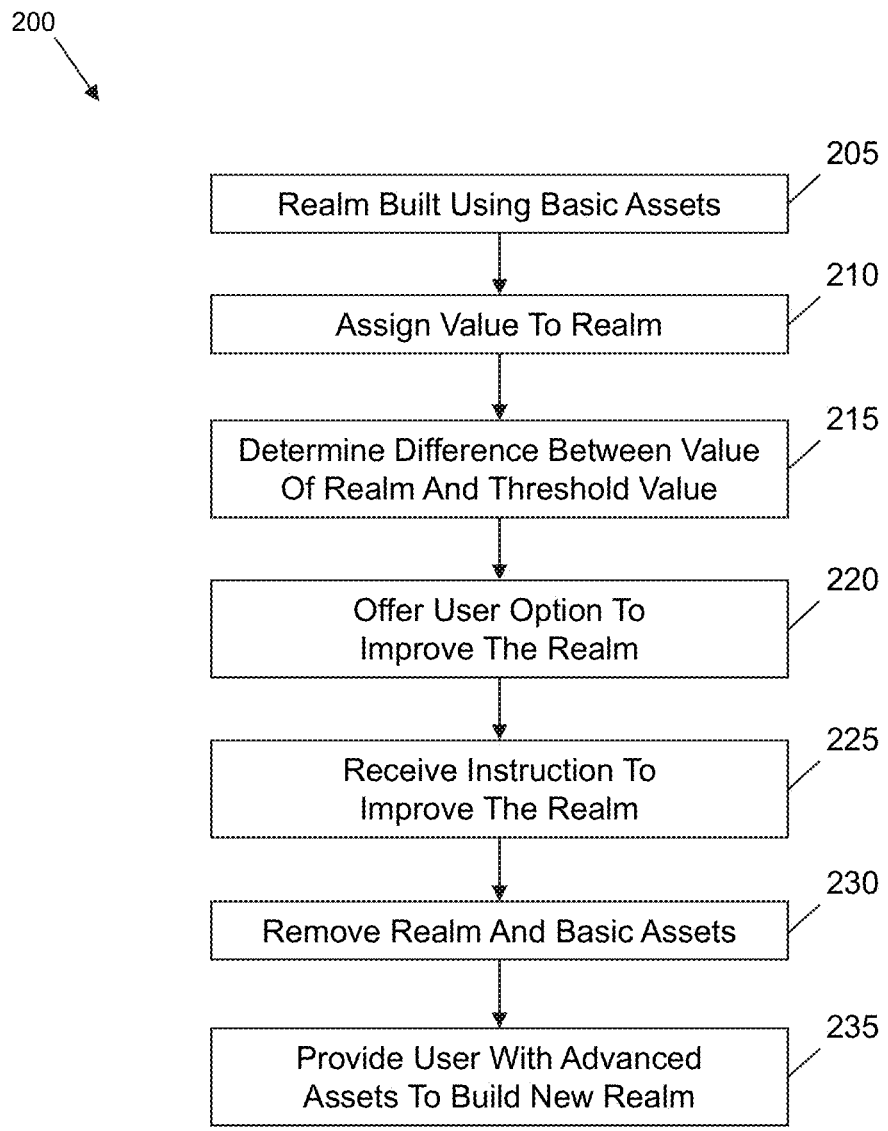
FIG. 2 depicts a method 200, executed on a computer processor, for extending a user's play of a realm-building game.

FIG. 2 depicts a method 200, executed on a computer processor, e.g., processor 185, for extending a user's play of a realm-building game. The method 200 assumes at operation 205 that the realm-building game has a realm built from one or more basic assets. The method 200 continues at operation 210 by assigning a value to the existing realm based on the basic assets used to build it. Then, at operation 215 a difference is determined between the value of the existing realm and a threshold value. Then the user is offered the option to improve the existing realm for a cost at operation 220. In some implementations, the cost is based on the difference between the value assigned to the existing realm and the threshold value. In some implementations the cost to improve the existing realm is zero if the value assigned to the realm is above the threshold value, i.e., it is free to improve the realm. In some versions, the value assigned to the existing realm may periodically be recalculated. If the user continues to build the realm, the value may increase over time and cause a corresponding decrease in the cost to improve the existing realm offered to the user.

If the user decided to improve the realm, the instruction to improve the realm is received at operation 225 and the existing realm and the basic assets are removed at operation 230. Then, the user is provided at operation 235 with one or more advanced assets to build a second realm. In some versions, the user may be provided with one or more advanced units, troops, and/or characters that were not previously available to the user before the instruction to improve the realm was received. The method may also include offering the user the option to associate with a faction. In these versions, the advanced assets offered to the user may be based on which faction the user associated with. In some cases, the advanced units available to the user may also be based on which faction the user associated with. Additionally or alternatively, one or more in-game bonuses may be provided to the user based on the chosen faction.

In some implementations method 200 may also include improving a competitive metric in the game in response to the user's decision to improve the realm. For example, there may be a metric such as "Might" that fluctuates over time, both increasing and decreasing depending on factors such as number of assets used by the user, number of units or troops the user has, virtual goods stored in the user's account, and/or other gameplay-based metrics. In some implementations, the user choosing to improve the realm provides a bonus to the user's Might. Additionally or alternatively, improving the realm may create a base level of Might that the player cannot fall below.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method, executed on one or more computer processors, for extending a user's play of a realm-building game, wherein the realm-building game comprises a first realm built from one or more basic assets in a virtual space of an online competitive multiplayer game, the method comprising:

executing an instance of the virtual space and implementing the instance of the virtual space to facilitate user participation in the online competitive multiplayer game;

assigning a realm value, using the one or more computer processors, to the first realm in the virtual space of the online competitive multiplayer game based on respective values associated with the one or more basic assets used to build the first realm;

determining, using the one or more computer processors, a difference between the realm value of the first realm and a predetermined threshold value;

offering, to the user, an option to improve the first realm for a cost determined based on the difference between the realm value assigned to the first realm and the predetermined threshold value;

receiving from the user, an instruction to accept the offer to improve the first realm at the determined cost to the user;

in response to receiving the acceptance of the offer and acceptance of the determined cost from the user, removing, using the one or computer processors, the first realm and the one or more basic assets from the instance of the virtual space of the online competitive multiplayer game; and providing, using the one or more computer processors, the user with one or more advanced assets to build a second realm in the instance of the virtual space of the online competitive multiplayer game by replacing the first realm with the second realm and replacing the one or more basic assets with the one or more advanced assets to replay the online competitive multiplayer realm-building game in the instance of the virtual space.

2. The method of claim 1, wherein the determined cost to improve the first realm is zero if the realm value assigned to the first realm is above the predetermined threshold value.

3. The method of claim 1, wherein the realm value assigned to the first realm may increase over time and cause a corresponding decrease in the determined cost to improve the first realm offered to the user.

4. The method of claim 1, further comprising offering an association with a faction to the user and wherein the one or more advanced assets are based on which faction the user associates with.

5. The method of claim 4, wherein one or more in-game bonuses are provided to the user based on which faction the user associates with.

6. The method of claim 1, further comprising improving a competitive metric in the online competitive multiplayer game in response to the user's acceptance to improve the first realm.

7. The method of claim 1, wherein the one or more advanced assets comprises one or more advanced units, troops, and/or characters that were not previously available to the user before the instruction to accept the offer to improve the realm was received.

8. The method of claim 1, wherein the determined cost to improve the first realm is an amount of virtual currency.

9. A system for a realm-building game, the system comprising:

one or more memory devices configured to store computer program modules; and one or more processors configured to execute the computer program modules, the computer program modules comprising:

a space module configured to execute an instance of a virtual space and to implement the instance of the virtual space to facilitate user participation in an online competitive multiplayer game;

a realm management module configured to provide realm building tools to a user, the realm building tools comprising a set of one or more assets;

an asset management module configured to provide the set of one or more assets to the realm building tools, the set of assets initially comprising one or more basic assets;

a user account module configured to manage a user account associated with the user, the user account comprising a first realm built from the one or more basic assets in the virtual space;

a realm valuation module configured to assign a realm value to the first realm in the virtual space of the online competitive multiplayer game based on respective values associated with the one or more basic assets used to build the first realm; and a realm improvement module configured to offer an option to the user to improve the first realm for a cost, wherein the cost to improve the first realm is based on the difference between the realm value assigned to the first realm and a predetermined threshold value, and further configured to, in response to receiving an acceptance of the offer and acceptance of the determined cost from the user, remove the first realm from the instance of the virtual space of the online competitive multiplayer game and to direct the asset management module to provide a set of one or more advanced assets to the realm management module for use in the realm building tools to build a second realm in the instance of the virtual space of the online competitive multiplayer game by replacing the first realm with the second realm and replacing the one or more basic assets with the one or more advanced assets to replay the online competitive multiplayer realm-building game in the instance of the virtual space.

10. The system of claim 9, wherein the realm improvement module is configured to offer the option to the user to improve the first realm for a zero cost if the realm value assigned to the first realm by the realm valuation module is above the predetermined threshold value.

11. The system of claim 9, wherein the realm valuation module is further configured to periodically recalculate the realm value assigned to the first realm.

12. The system of claim 9, further comprising:

a faction association module configured to offer an association with a faction to the user and to receive the user's response to the offer; and wherein the asset management module is further configured to base which advanced assets of the set of one or more advanced assets provided to the user on the user's response to the offer to associate with the faction.

13. The system of claim 12, further comprising a bonus module configured to provide one or more in-game bonuses to the user based on the user's response to the offer to associate with the faction.

14. The system of claim 9, wherein the realm-building tools provide the user with one or more advanced units, troops, and/or characters that were not previously available to the user before the offer was made to improve the realm.

15. The system of claim 9, wherein an asset in the set of one or more advanced assets takes up less space within the virtual space of the online competitive multiplayer game than a corresponding asset in the set of one or more basic assets.

16. The system of claim 9, wherein an asset in the set of one or more advanced assets allows the user to control a plurality of resources by using the asset.

17. The system of claim 9, wherein the determined cost to improve the first realm is an amount of virtual currency.

* * * * *